United States Patent [19]
Maruska

[11] Patent Number: 5,452,118
[45] Date of Patent: Sep. 19, 1995

[54] OPTICAL HETERODYNE RECEIVER FOR FIBER OPTIC COMMUNICATIONS SYSTEM

[75] Inventor: H. Paul Maruska, Acton, Mass.

[73] Assignee: Spire Corporation, Bedford, Mass.

[21] Appl. No.: 49,842

[22] Filed: Apr. 20, 1993

[51] Int. Cl.[6] .......................................... H04B 10/06
[52] U.S. Cl. .................................. 359/191; 359/163; 385/14; 257/82
[58] Field of Search ............................... 359/191–192, 359/189, 195, 162–163; 385/14, 41, 131; 257/82

[56] References Cited

U.S. PATENT DOCUMENTS 4,903,341 2/1990 Rice ...................................... 359/191

OTHER PUBLICATIONS

T. Pamulapati et al., "Noise Suppression Characteristics of InP–Based Monopolitohically . . . ", *IEE Photonics Technology Letters*, vol. 3, No. 4, Apr. 1996, pp. 257–359.
B. L. Kasper et al., "Balanced Dual-Detector Receiver for Optical Heterotyne . . . ", *Electronics Letters*, 10th Apr. 1986, vol. 22, No. 8, pp. 413–414.
H. Takeuchi et al., "Monopolithic Integrated Coherent Receiver on InP Substrate", *IEEE Photonics Letters*, vol. 1, No. 11, Nov. 1989, pp. 398–400.
G. L. Abbas et al., "Local-Oscillator Excess-Noise Suppression for Homodyne . . . ", *Optics Letters*, vol. 8, No. 8, Aug. 1983, pp. 419–421.
Stephen B. Alexander, "Design of Wide-Band Optical Heterodyne . . . ", *Journal of Lightwave Technology*, vol. LT-5, No. 4, Apr. 1987, pp. 523–537.
Horace P. Yuen et al., "Noise in Homodyne and Heterodyne Detection", *Optics Letters*, vol. 8, No. 3, Mar. 1983, pp. 177–179.
Gregory L. Abbas et al., "A Dual-Detector Optical Heterodyne Receiver . . . ", *Journal of Lightwave Technology*, vol. LT-3, No. 5, Oct. 1985, pp. 1110–1122.
T. L. Koch et al., "Balanced Operation of a GaInAs/GaInAsP . . . ", *IEEE Photonics Technology Letters*, vol. 2, No. 8, Aug. 1990, pp. 577–580.
S. Chandrasekhar et al., "Integrated Directional Couplers with Photodetectors . . . ", *Electronics Letters*, vol. 24, No. 18, 1 Sep. 1988, pp. 1145–1146.
T. L. Koch, "GaInAs/GaInAsP Multiple-Quantum-Well Intergrated Heterodyne Receiver", *Electronics Letters*, vol. 25, No. 24, 23rd Nov. 1989, pp. 1621–1623.
O. Wada et al., "Fabrication of Monolithic Twin-GaInAs Pin Photodiode . . . ", *Electronics Letters*, vol. 24, No. 9, 28th Apr. 1988, pp. 514–516.
M. Makiuchi et al., "High-Speed Monolithic GaInAs Twin-Pin . . . ", *Electronics Letters*, vol. 25, No. 17, 17th Aug. 1989, pp. 1144–1145.

(List continued on next page.)

*Primary Examiner*—David K. Moore
*Assistant Examiner*—Kinfe-Michael Negash
*Attorney, Agent, or Firm*—Morse, Altman, Dacey & Benson

[57] ABSTRACT

A monolithic integrated optical heterodyne receiver circuit formed on a single chip and a process of its manufacture are disclosed. The heterodyne receiver circuit essentially includes a tunable local oscillator formed on a substrate for generating a first light beam, a first waveguide coplanarly formed on the substrate adjacent to the local oscillator for transmitting the first light beam, a second waveguide formed on top of the first waveguide for receiving and transmitting an information-encoded second light beam, a coupler region sandwiched between the first and second waveguides for mixing the two light beams, and a pair of detectors mounted in electrical series with one another for converting the mixed light beams to a radio frequency signal operating at an intermediate frequency.

12 Claims, 4 Drawing Sheets

OTHER PUBLICATIONS

Josef Georgbauer et al., "InGaAs Dual–Pin Detector with Very Symmetric . . . ", *IEEE Electron Device Letters,* vol. 10, No. 12, Dec. 1989, pp. 583–584.

Tom Waite, "A Balanced Mixer for Optical Heterodyning . . . ", *Proceedings of the IEEE,* vol. 54, Feb. 1966, pp. 334–335.

Stanley, "A Tutorial Review of Techniques for Coherent Optical Fiber Transmission", Reprinted from (pp. 18–35), *IEEE Commun. Mag.,* vol. 23, No. 8, pp. 37–53, Aug. 1953.

B. M. Oliver et al., "Thermal and Quantum Noise", *Proceedings of the IEEE,* vol. 53, May 1965, pp. 436–454.

S. Chandrasekhar et al., "Balanced Dual Photodiodes Integrated with a . . . ", *Electronics Letters,* vol. 24, No. 23, 10th Nov. 1988, pp. 1457–1458.

R. J. Deri et al., "Low–Loss Monopolithic Integration of Balanced Twin- . . . ", *IEEE Photonics Technology Letters,* vol. 2, No. 8, Aug. 1990, pp. 581–584.

OPTICAL HETERODYNE RECEIVER FOR FIBER OPTIC COMMUNICATIONS SYSTEM

BACKGROUND OF THE INVENTOR

1. Field of the Invention

The present invention relates generally to optical communication systems and, more particularly, to a tunable optical heterodyne receiver circuit monolithically integrated onto a single semiconductor chip that recovers the entire information signal by summation and achieves cancellation of any excess intensity noise that may be generated by the local oscillator laser.

2. The Prior Art

Communication systems transmitting voice, video and data, are in the process of being upgraded from radio-frequency (RF) carriers to optical carriers. The development of lasers, and especially semiconductor lasers, has made it possible to transmit information by modulating one of the parameters of the optical field, typically its intensity. It is also possible to modulate the frequency or the phase of the lightwave. Increasingly, optical fibers are used as waveguides for transmitting the signals from a point of generation to the premises of a user. Low signal attenuation and large bandwidths are the primary characteristics that make optical fibers so attractive for telecommunications applications.

Optical fiber waveguides presently in use have bandwidths that generally exceed 20 THz. In principle, many separate signals may be broadcast in the same fiber system, each one transmitted at a slightly different frequency of the optical carrier, a technique known as Frequency Division Multiplexing (FDM). However, at present, upon detection of the optical field, the transmitted information signals are downconverted by an electronic circuit to basebands having substantially smaller bandwidths, that is about 1 GHz or less. There is no way to differentiate multiple channels. Consequently, the full capabilities of the optical fiber transmission waveguides remain severely under-utilized. An optical fiber has the potential to carry simultaneously more than 1000 separate signal channels, each requiring a bandwidth on the order of 1 GHz. Means must be provided, however, for demultiplexing all of these channels.

For the past five decades, almost all communication systems operations in the radio-frequency (RF) segment of the spectrum have relied upon heterodyne detection because of the channel selectivity, along with heightened sensitivity, afforded thereby. Heterodyne reception is based on combining the incoming radio-frequency signal with a locally generated RF signal of slightly different frequency. The information signal is down-converted to an intermediate Frequency (IF), which is the difference between the original signal carrier frequency and the local oscillator frequency. By tuning the local oscillator frequency, the user may convert any broadcast signal to the same IF; all other channels are rejected by a single electrical filter which is set to pass only IF. The IF is subsequently detected, amplified, and made available to the user. Thus choice of channel is available in RF systems. Presently however, most if not all commercial optical communication systems rely on simple direct detection of the optical carrier. Direct detection makes no use of either the wavelength or the phase of the light wave but only counts the modulation of the intensity of the optical signal. Optical heterodyne detection will play an ever more important role in future communication systems. Heterodyne detection, also known as coherent detection, as opposed to direct detection, is therefore gaining importance in long-distance optical communication systems, such as transcontinental telephone systems. The changeover to optical heterodyne communication systems has, however, been retarded by the physical complexity of the receiver designs. In order to utilize to the fullest the recent advances in system capabilities offered by optical heterodyne techniques, it is necessary, amongst other requirements, that the receiver components be monolithically integrated onto a single chip.

In coherent detection, a weak received signal is mixed with a strong local oscillator (LO) wave at a close enough frequency, resulting in an effective signal gain through coherent phase interference. The gain is proportional to the local oscillator amplitude. The recovered electrical signal power at IF is proportional to the product of the amplitude of the optical information signal and the amplitude of the local laser field. In direct detection, the recovered electrical signal power is proportional to the square of the amplitude of the incoming optical signal. If the amplitude of the local oscillator exceeds the amplitude of the incoming optical signal, which is the usual case, then in the heterodyne system, gain is proportional to their ratio.

Signal-to-noise ratio is a vital parameter in a communications system. In a heterodyne receiver, recovered IF signal power is proportional to the product of the optical signal power and the local oscillator power. Obstructing noise is proportional to the sum of the two optical power levels plus the noise power generated in subsequent electronic amplifiers. If the local oscillator power is made sufficiently large, all factors cancel except the optical signal power giving the ultimate receiver sensitivity of one photon per bit to get a signal-to-noise ratio of one. There are some inherent problems, however. For any semiconductor laser there is an additional noise source, called excess intensity noise. This excess noise will not cancel from the signal-to-noise ratio relationship. It severely degrades the performance of a heterodyne receiver. As the local oscillator signal power is increased, the measured shot noise in the detector and the noise from the laser often exceed the signal gain. A balanced detector configuration, in which two identical detectors are connected together in electrical series, allows the suppression of the local oscillator laser intensity noise.

A properly functioning optical heterodyne receiver requires three basic components: a set of parallel waveguides, a tunable laser, and a means of detecting the interference pattern generated by the coupling of the two optical waves in the adjacent waveguides. Since there are two optical waves present in two waveguides, there will always be two output signals, preferably of equal amplitude, but also 180° out of phase. Thus the receiver should provide two detectors. Due to considerations of collecting all of the inherent signal power while suppressing excess noise in the receiver, these two detectors require a particular placement. No presently known design of an integrated optical heterodyne receiver chip advantageously places the two detectors thereon.

Early versions of balanced optical heterodyne receivers were based on the use of hybrid RF junctions or transformers to allow the signals from the two detectors to be subtracted. There are advantages inherent in directly connecting the two photodiodes to a common FET amplifier. First, thermal noise generation can be kept low because the input impedance can be made high while the capacitance can be minimized. Second, because the detectors are connected directly in series electrically and both are subjected to a proper level of reverse bias, the DC component of the photocurrent, due to the local oscillator, flows directly to ground and not into the amplifier input. DC saturation of the amplifier input is thereby avoided. Most important, monolithic intergration becomes possible. Many dual detector schemes have recently been presented, but they always fabricate the two detectors adjacent one another on the substrate, basically in parallel electrically. Connecting the detectors in electrical series therefore is basically not possible, unless an insulating substrate is used, which makes it extremely difficult to form electrical contacts for the tunable laser. On a conducting substrate, when the detectors have been situated in electrical parallel, it has been necessary to perform signal processing external to the chip with a microwave phase shifter/combiner in order to achieve signal addition and noise cancellation. Such external processing structure effectively doubles the thermal noise of the front end of the receiver, however.

SUMMARY OF THE INVENTION

It is a principal object of the present invention to overcome the above disadvantages by providing an optical heterodyne receiver circuit monolithically integrated on a single chip designed to achieve signal summation and simultaneous cancellation of the excess intensity noise from the local oscillator laser, and a process of making the same.

More specifically, it is a object of the present invention to provide an integrated optical heterodyne receiver circuit, and a process for making it, in which the circuit essentially comprises a local oscillator and a first waveguide coplanarly formed therewith, a second waveguide formed in spaced parallel relation on top of the first waveguide, with a coupler region sandwiched therebetween, and a pair of detectors coplanarly mounted and directly butt-coupled to the first and second waveguides, for converting the light beams intermixed in the coupler region to an intermediate frequency electrical signal. The pair of detectors are grown to be directly in electrical series to one another. The two waveguides leading to the pair of detectors are of equal lengths. Preferably, the pair of detectors abut the coupler region at a point where each optical light beam has undergone a 50% transfer into its twin waveguide. Preferably, any D.C. components of the resultant intermediate frequency signal are driven to ground through the substrate on which the receiver circuit is formed. The desired signal from the receiver circuit is available at the junction between the pair of detectors. Preferably, the optical heterodyne receiver circuit is formed of a semiconductor film comprising InP and its alloys, essentially by successive chemical vapor depositions, interrupted for forming the distributed Bragg reflectors. The inventive process includes connecting the two detectors directly in electrical series, while maintaining the desirability of having a conducting substrate.

Other objects of the present invention will in part be obvious and will part appear hereinafter.

The invention accordingly comprises the integrated optical heterodyne circuit of the present disclosure and a process of making such a circuit, its steps, components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION OF THE PREFERRED EMBODIMENTS

In general, the present invention pertains to optical communication systems and, more specifically, to an optical heterodyne receiver circuit monolithically integrated onto a single semiconductor chip. The optical heterodyne receiver circuit formed according to the invention achieves signal summation as well as suppression of excess intensity noise generated by the local oscillator (LO) laser diode.

The optical heterodyne receiver circuit essentially comprises, on a single chip, all of the receiver front end components, presenting a sturdy, compact, rugged and reliable balanced receiver exhibiting nearly quantum limited performance.

Since all of its required input components, namely a local oscillator (LO) laser, a waveguide directional coupler/mixer, and a pair of waveguide detectors, are integrated on a single semiconductor chip, problems heretofore encountered in aligning the discrete components and maintaining them in precise alignment in extended use have been obviated.

Further, in accordance with a preferred method of making such optical heterodyne receiver circuits on single semiconductor chips, it is assured that these three input components are coplanar to one another, and will remain coplanar however strenuous the environmental demands may be on the chip's use.

Figure 1:
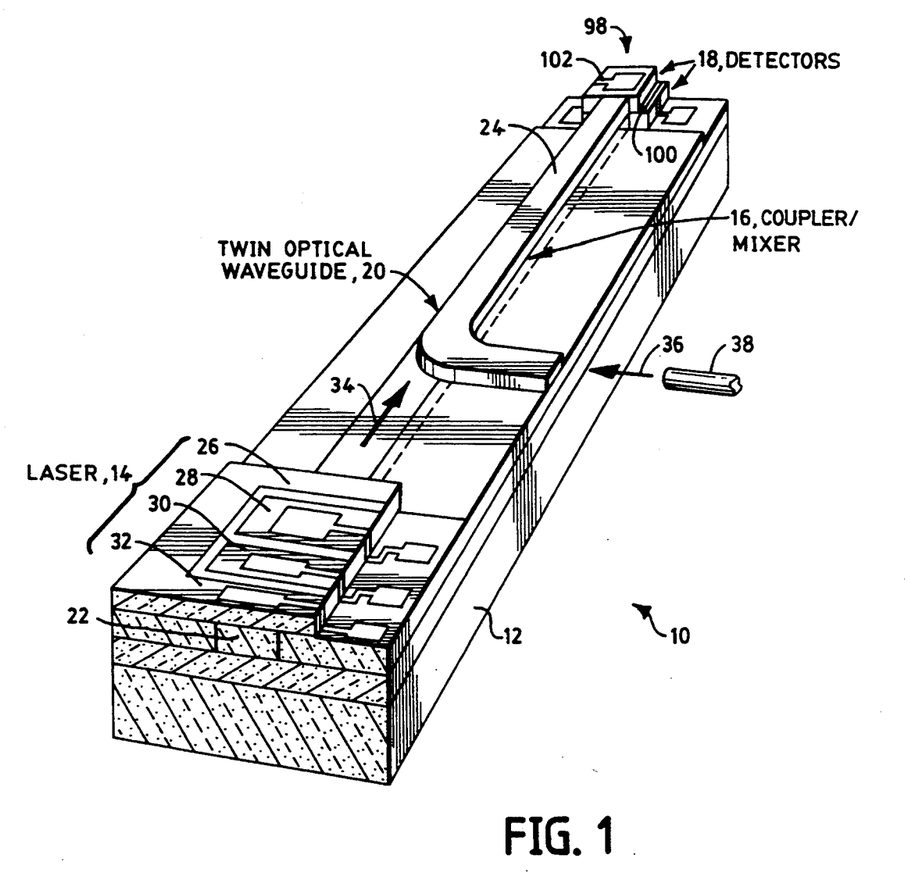
FIG. 1 is a perspective illustration of an optical heterodyne receiver front end circuit integrated into a single semiconductor chip embodying the invention.

FIG. 1 is a perspective illustration of an optical heterodyne receiver circuit 10 formed on a single semiconductor chip 12 and embodying the invention. The three input components of the circuit 10, to wit: a local oscillator (LO) laser 14, a waveguide directional coupler/mixer 16, and a tandem pair of waveguide detectors 18 are all integrated on the same semiconductor chip 12.

One important feature of the optical heterodyne receiver circuit 10 resides in the provision of a twin optical waveguide 20, formed as a rib having a lower level 22, serving as a bottom waveguide for conducting the LO optical wave, and an upper level 24, serving as a top waveguide for conducting the received optical signal wave. Waveguides 22 and 24 are separated by a fixed spacer in the waveguide directional coupler/mixer 16 region. Preferably, the LO laser 14 is a tunable local oscillator laser, which is best provided by a distributed Bragg reflector (DBR) laser. The LO laser 14 comprises a partially transmitting front Bragg mirror 26, an active gain region 28, a phase correction section 30, and a high reflectivity rear Bragg mirror 32.

Figure 2:
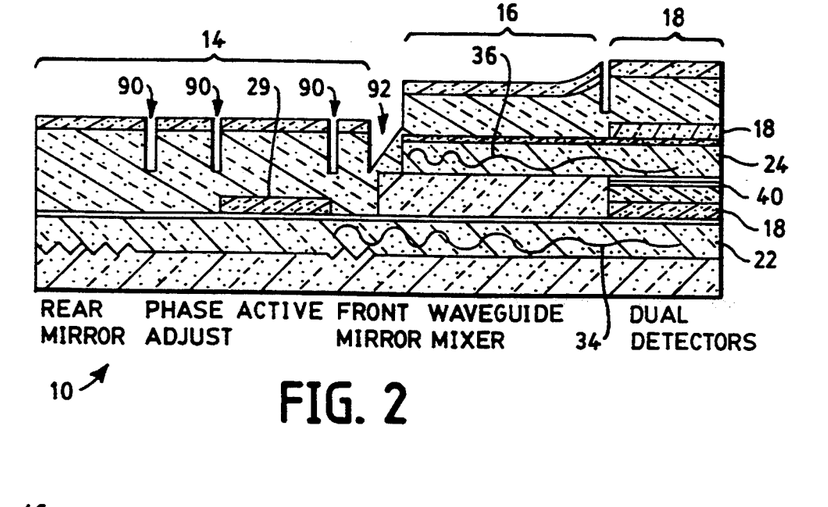
FIG. 2 is an elevational view, partly in section, of an optical heterodyne receiver front end circuit constructed in accordance with the invention.

As may be best observed in FIG. 2, the lower waveguide 22 is coplanarly formed, is continuous through the region of the local oscillator laser 14. A local oscillator light beam 34 of selectible tunable wavelength, generated in a quantum well 29 of the active gain section 28 of the LO laser 14, is conducted through the lower waveguide 22 to the coupler/mixer region 16. A second light beam 36, representing the weak incoming signal, is coupled into the upper waveguide 24 via a single-mode fiber 38, and first passes through the input section of the upper waveguide 24. The two light beams 34 and 36 are constrained to travel together through the waveguide directional coupler/mixer region 16, where they are mutually coupled through the overlap of their evanescent fields therein. Directly at the physical point where each light beam 34 and 36 has undergone exactly 50% transfer into its twin waveguide 22 and 24, respectively, the tandem pair of dual detectors 18, 18 (preferably waveguide photodiode detectors) are located. The mixed lightbeams are totally absorbed in the respective detectors 18, 18, and both a constant (DC) component and a time varying (AC) electrical signal will be manifested in each detector. The AC signal will vary at the intermediate (IF) frequency, which is equal in magnitude to the difference between the carrier frequency of the signal lightbeam, and the frequency of the LO lightbeam. The DC component will be exactly equal in both detectors, and since they are formed in electrical series, this DC component, which serves no useful purpose, will be sent directly to ground through the semiconductor substrate 12. The desired output information signal from the optical heterodyne receiver circuit 10 is available at a juncture 40 located between the pair of tandem waveguide detectors 18, 18. Juncture 40 is, in effect, the p/n tunnel junction formed between the tandem waveguide detectors 18, 18, due to the prescribed method of growth. Since the tandem waveguide detectors 18, 18 are directly connected in electrical series and operated under reverse bias conditions, the output information signal available at the juncture 40 represents the difference between the following intensities that originated in the two input light waves 34 and 36, to wit: the desired signal, the standard shot noise, and the excess intensity noise. The magnitudes of these intensities are decided by the relative phase of each lightwave in each detector, since a subtraction process is in effect. Since the invention method insures that the optical-to-electrical conversion efficiencies of the two tandem detectors, 18, 18 are equal, the two information signal intensities add, because they are 180° out of phase; the two standard shot noise intensities also add; but the excess intensity noise becomes zero, because the two components arrive in phase. Thus, signal processing is now performed directly on the chip 12.

The optical heterodyne receiver circuit 10 of the invention is essentially formed on the single semiconductor chip 12 by several separate metalorganic chemical vapor depositions (MOCVD), interrupted by component definition steps effected by chemical etching. This process of forming the optical heterodyne receiver circuit 10 is best described with reference to FIGS. 3-12, respectively illustrating the salient steps thereof.

It is best to start with an n-type wafer, having an (100) orientation. The gratings for the two Bragg mirrors can be formed selectively by holographic lithography, using a He-Cd laser emitting at 325 nm. The operating waveguide will be 4-5 um wide, and this will be the width of the mirrors as well. The rear mirror will be made to be highly reflective at the 1.55 um wavelength of the laser, and therefore will be about 250-350 um long. The front mirror will be partially reflecting, to allow light to pass into the waveguide mixer, and therefore will be processed to be 80-100 um long. Gratings will be fabricated as follows. The wafer will be coated with Shipley AZ-1350 photoresist, diluted with two parts of resist thinner, and spun on at 8000 rpm to give a thickness of 100 nm. The resist will be prebaked at 90° C. for 15 minutes. The 5 mW He-Cd laser beam will be split into two beams, and the holographic exposure will be carried out. The two beams will be incident from two sides of the wafer to create the interference pattern, with the angle of each beam referred to the normal to the surface of the wafer approaching 90°. An exposure time of about 5 sec will be required. The resist will be developed and post-baked at 90° C. for 5 min. Then the patterns of the gratings will be transcribed to the wafer surface by etching with a 1:1:1 solution of $HCl:CH_3COOH:H_2O_2$ at 30° C. for about 3-5 sec. We require a pattern with a pitch of 250 nm and a depth of about 80 nm.

Figure 3:
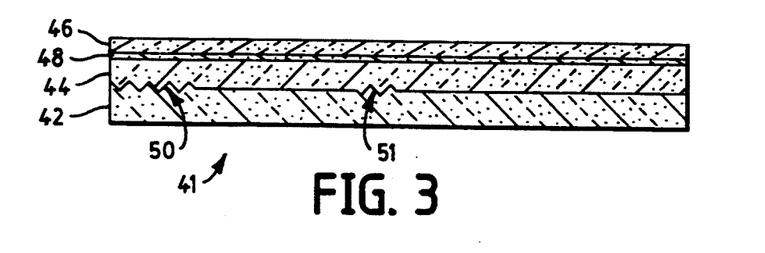
FIGS. 3–12 are elevational sections, illustrating the salient steps of forming an optical heterodyne receiver front end circuit on a single semiconductor chip according to the invention.
Figure 4:
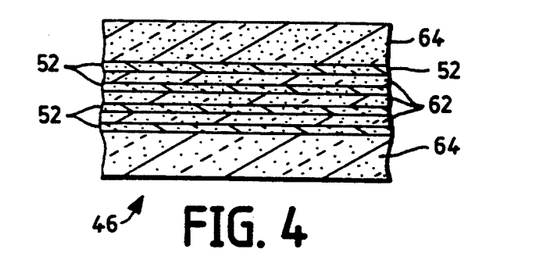

In the first growth sequence illustrated in FIG. 3, a sample material 41 is shown on which layers 42, 44, 46 are deposited by MOCVD. These layers 42, 44, and 46 function as Distributed Bragg Reflector (DBR) laser, lower waveguide 44, and lower detector 46 respectively, and are separated by an etch-stop layer 48. Layer 42 serves as the substrate 12, preferably formed of n-InP film. The growth will proceed with the deposition thereon of the first waveguide 44 having a thickness in the range of 200-250 nm, and nominal composition of ½ (72% indium, 28% gallium)+½ (58% arsenic, and 42% phosphorous), viz., InGaAsP. This quaternary waveguide layer 44 exhibits a photoluminescence peak at a wavelength about 1.3 um, and is thus basically transparent to the generated laser radiation at 1.55 um. Following the deposition of a 25 um thick n-type InP etch-stop layer 48, a plurality of quantum wells are deposited. The quantum well section 46 preferably has quantum wells 52 each with a thickness on the order of 8-10 nm, and a composition of ½ (53% indium, 47% gallium) and ½ (100% arsenic), viz., InGaAs. There can be from one to about five such quantum wells 52 formed in the material 46. Each quantum well is separated from the next by about 10 nm of InGaAsP, which functions as barrier material 62. The set of quantum wells are sandwiched between two identical spacers 64, 64, each about 50 nm thick, and each having the composition of InGaAsP. The required layers for the quantum well structure are shown in detail in FIG. 4.

Figure 5:
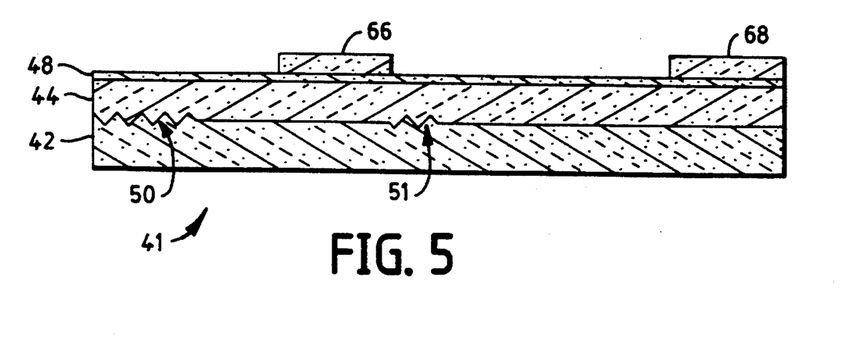

Following the MOCVD growth described above, the sample material 41 is removed from the reactor, and selective wet chemical etching, defined by photolithography, is used to remove the active quantum well set in the passive waveguide portions, and in the regions of the Bragg mirrors 50 and 51 and the phase compensator in the laser section, to prevent reabsorption of the lightwave, note FIG. 5. Preferably, the phase compensator section 30 is about 100 um long. A section 66 of about 400 um length of the material 46 is left for the active region, and a section 68 about 200 um of material 46 for the detector region, where absorption of the optical signal is required. The waveguide mixer region is on the order of 1 mm long.

Figure 6:
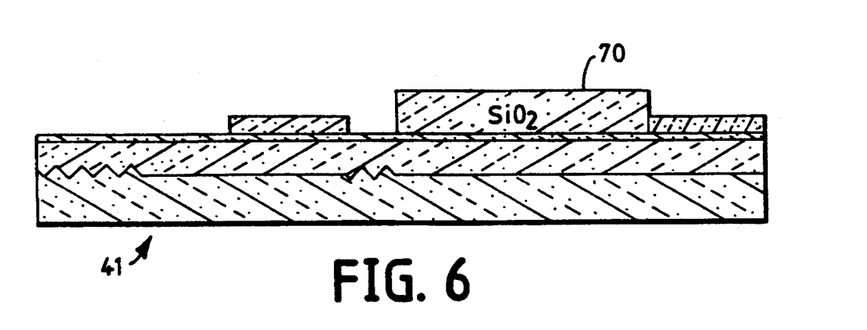
Figure 7:
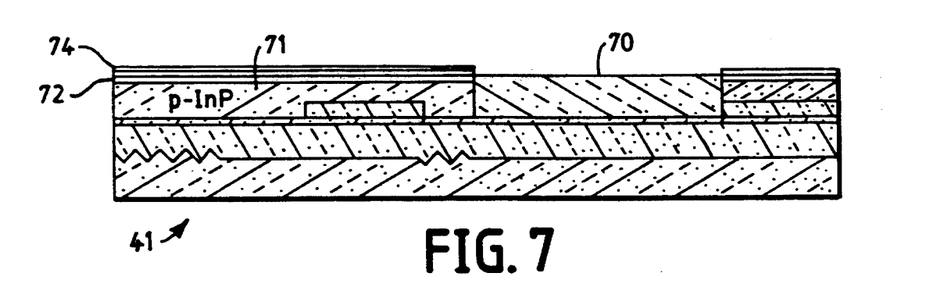

Next, an oxide film 70 is grown upon the the portion of the sample material 41 which will form the waveguide mixer 16, as shown in FIG. 6. Then selective area epitaxy is performed over the remainder of the device area, as shown in FIG. 7. First, there is the deposit of about 1 um of p-type InP 71, followed by about 200 nm of n-type InP 72, and a 25 nm InGaAsP etch-stop layer 74. The InP n/p junction 40 is the center contact for the dual detectors.

Figure 8:
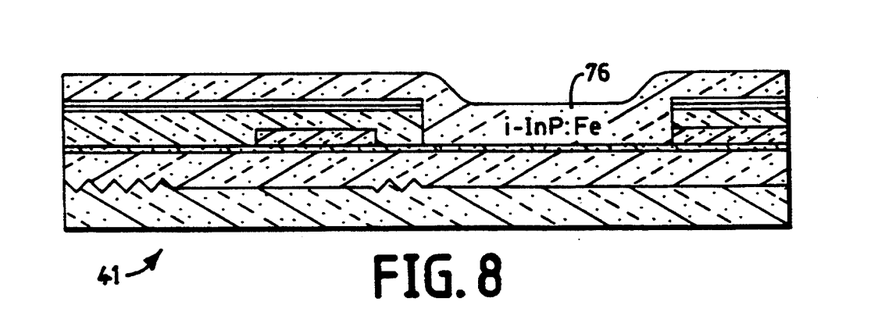

The oxide film 70 deposited upon the sample material 41 is removed, as shown in FIG. 8. Then insulating iron-doped InP layer 76 is grown over the entire wafer material 41. This i-InP:Fe layer 76 forms the coupler for the waveguides in the mixer region 16. The thickness of the layer 76 preferably is on the order of 1 um. The exact thickness of the layer 76 requires a calculation for a specific case, since there is a trade-off between mixer length and coupling layer thickness.

Figure 9:
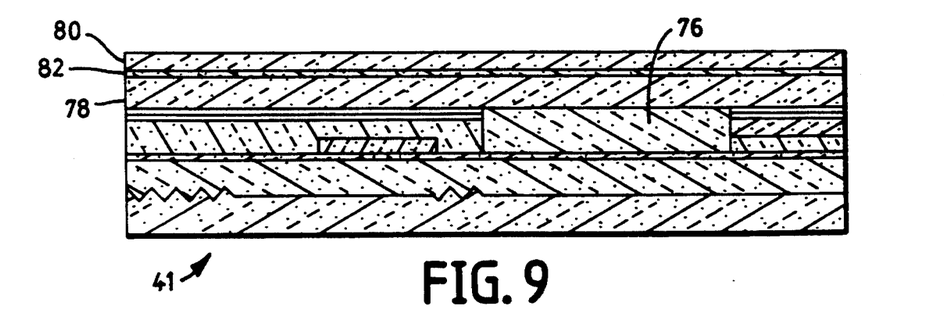

Using photolithography and wet chemical etching, all of the InP:Fe layer 76 is removed, except for the coupler region. Then the upper waveguide 78 and the next set of MQWs 80, identical to the first deposition of layer 46, is grown. A 25 nm etch-stop of n-type InP layer 82 is grown between the waveguide 78 and the quantum wells 80. These steps are illustrated in FIG. 9.

Figure 10:
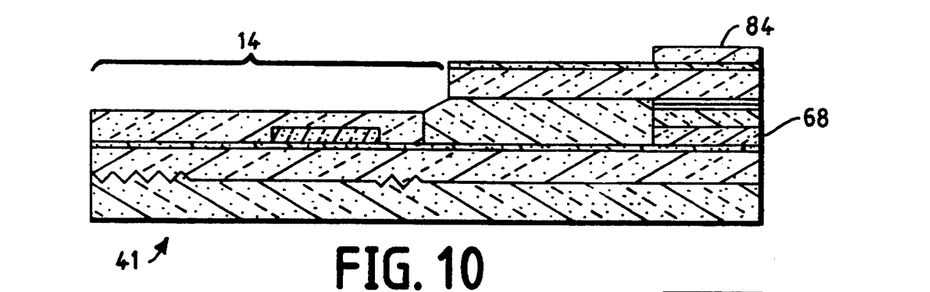

Using photolithography and wet chemical etching, the MQW layer 80 is removed, except to define a second detector 84, identical in length to the first detector 68. The upper waveguide 78 also is etched away from the DBR laser region 14. The structure of the sample device at this point is shown in FIG. 10.

Figure 11:
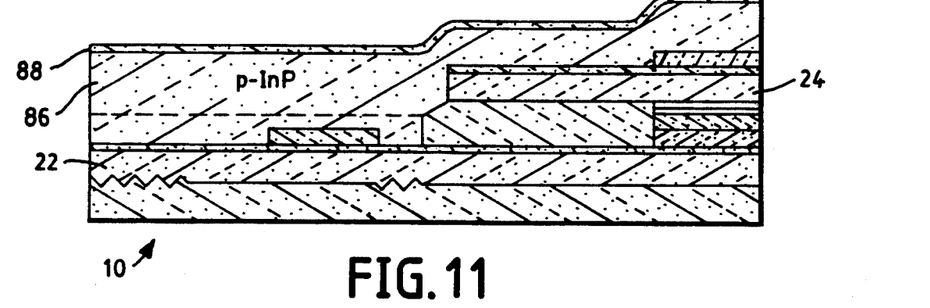
Figure 12:
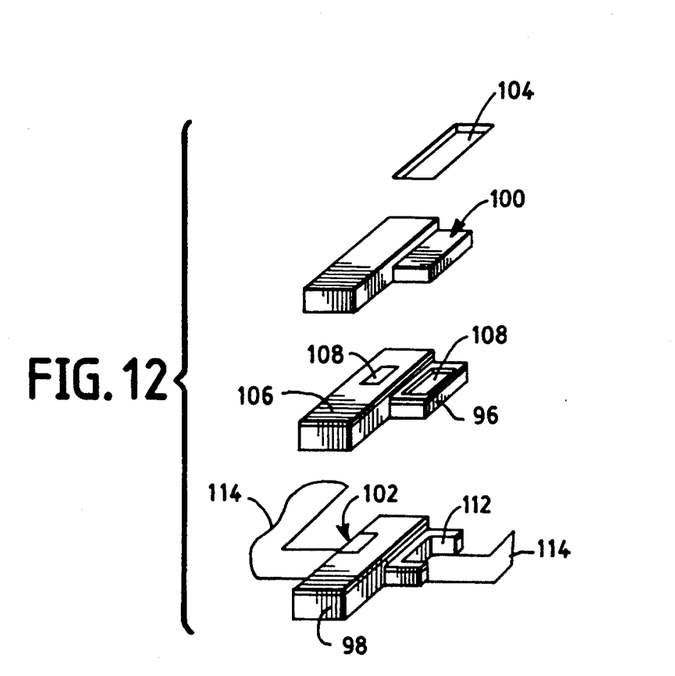

Next, over the entire wafer device 41, a p-type InP layer 86 is deposited, followed by p-type InGaAs layer 88. The final layer 88 provides a good ohmic contact to the various sections of the photonic integrated circuit. Stripes 90 and 92 are then etched sideways, note FIG. 2, each about 20 um wide, except the one 92 separating the front Bragg mirror and the upper waveguide, which will be about 50 um. These stripes 90 and 92 define each of the functions of the device. The final configuration of all the layers so as to form the device 10, but before the stripes 90, 92 are etched, is shown in FIG. 11.

Finally, a photolithographic process is used to create a high mesa profile over the entire device, to make a dual waveguide about 4-5 um wide. Then the wafer 41 is planarized by growing insulating InP:Fe to fill all of the etched sections. The rib waveguides are thus enclosed on all four sides with InP, assuring single moded guided wave operation. Final metallization 96 provides contacts for the Bragg mirrors, the phase compensator, the active region of the laser, and the tandem detectors.

This new configuration therefore insures exactly the lengths of the mixer waveguides, and exact coplaner alignment of the waveguide/detector interfaces. Consequently, it will allow the signal processing to be performed directly on the chip.

Detector length must be sufficient to basically absorb all of the incoming light. There is a backbiased junction 40 between them, which must allow the DC component of the photocurrent to pass; the AC component, which contains the data, must be taken out between these two n and p-type layers, at the center 40 of the structure. These detectors will be n-i-p devices, and the n and p regions must be heavily doped, to allow a tunnelling current to pass the central junction 40. The i-region will consist of the multi-quantum wells.

The particular configuration of the detectors that is necessary for this receiver chip 10 requires that three electrical contacts be provided, note FIG. 1. The conduction substrate 12 functions as one contact, and therefore the back of the device 10 is metallized. The twin diodes 18, 18 need to be etched into the shape of a mesa 98, rising above the substrate floor. It is required to provide a ledge 100 on the side of the mesa 98 to make the middle contact. The third metal contact is to the top of the mesa, as at 102.

The following sequence of etch steps is required for producing the mesa 98, with the ledge 100. The etch sequence is diagrammed in FIG. 12. The processing sequence starts by generating a crater 104, which serves to define the top of the ledge 100. Therefore, this crater 104 must be deep enough to access the InP contact layer 96 which contains the tunnel junction 40. The next step defines the total detector mesa 98 and its ledge 100. This requires removing all of the rest of the grown material, down to the substrate, only in the vicinity of the dual detectors. The region of the detector mesa 98 must be coated with an insulator 106, preferably silicon nitride, and two openings 108, 108 are formed in the silicon nitride by etching, one over the top of the mesa 98, and one over the top surface of the ledge 100. For a detector stack, one metal electrical contact 102 is located on the top of the mesa 98, and the other contact 112 is on the ledge 100. This ledge contact 112 is the contact where the information signal will appear. Finally, wiring pads 114, 114, will be defined to the side of the devices.

As stated, with a 3 dB directional coupler acting as the waveguide directional coupler/mixer region 16, each output light beam contains one half of the total information power. The total information power is in turn proportional to the square root of the product of the signal power and the LO power. In order to maximize received power, both beams are to be detected, and their electrical powers summed.

There is a second advantage to be gained by having two optical detectors. With laser sources, the phase and amplitude of the electromagnetic field within the laser cavity fluctuate in random Brownian motion due to coupling of the coherent field with spontaneous emission photons. This produces intensity noise in the lasing mode. Semiconductor lasers exhibit particularly large levels of excess quantum noise because the cavity has a gain over a relatively wide span of wavelength. The presence of intensity noise from the LO laser degrades receiver performance. By connecting the two detector diodes in electrical series, this excess noise source is eliminated.

Thus it has been shown and described an integrated optical heterodyne receiver circuit 10 and a process for forming the same, which circuit and process satisfy the object and advantages set forth above.

Since certain changes may be made in the present disclosure departing from the scope of the present invention, it is intended that all matter described in the foregoing specification or shown in the accompanying drawings, be interpreted in an illustrative and not in a limiting sense.

What is claimed is:

1. An integrated optical heterodyne receiver circuit formed on a single chip and comprised of:
   (a) a substrate;
   (b) a local oscillator formed on said substrate for generating a first light beam;
   (c) a first waveguide for transmitting said first light beam;

(d) a second waveguide formed on top of said first waveguide for receiving and transmitting an information-encoded second light beam;

(e) a coupler region sandwiched between said first and second waveguides for mixing said first and second light beams; and (f) a pair of detectors mounted adjacent to said first and second waveguides for converting said mixed light beams to an intermediate frequency signal;

(g) said pair of detectors being coupled in electrical series with one another;

(h) said intermediate frequency signal being obtainable at a function between said pair of detectors.

2. The integrated circuit of claim i wherein said first waveguide is coplanarly formed on said substrate adjacent to said local oscillator, and wherein said pair of detectors abut said coupler region at a point where each of said first and second light beams has undergone about a 50% transfer into its adjacent waveguide.

3. The integrated circuit of claim 1 wherein said intermediate frequency comprises both an A.C. and a D.C. component and wherein said D.C. component is driven to ground through said substrate.

4. The integrated circuit of claim 3 wherein said local oscillator is a tunable distributed Bragg reflector (DBR) laser.

5. A process of forming an integrated optical heterodyne receiver circuit on a single chip comprised of:

(a) providing a substrate;

(b) successively depositing on said substrate materials for integrally forming a local oscillator, a first waveguide and a lower detector therein; and (c) forming on a portion of said first materials, while masking the remaining portion, a directional coupler region, second waveguide and an upper detector;

(d) said detectors being formed in tandem, one above the other, and provided with a ledge access for electrical contact.

6. The process of claim 5 wherein said local oscillator is formed with a front and a rear reflector having grating periods between about 220 nm to about 250 nm.

7. The process of claim 6 wherein said grating periods are formed by a holographic-lithography technique.

8. The process of claim 5 wherein said first and second waveguides are transparent passive waveguides formed by chemical vapor deposition.

9. The process of claim 5 wherein said directional coupler region is formed of iron-doped InP.

10. The process of claim 5 wherein said substrate is enclosed by a cladding layer and a top contact layer at its upper surface and by a bottom contact layer at its bottom surface.

11. The process of claim 5 wherein a tunnel junction is formed by n- and p- doping between said detectors, and wherein said tunnel junction is accessible via said ledge access.

12. The process of claim 5 wherein said local laser is a tunable distributed Bragg reflector laser.

* * * * *